(12) United States Patent
Kobayashi

(10) Patent No.: US 11,453,341 B2
(45) Date of Patent: Sep. 27, 2022

(54) VEHICLE MIRROR DEVICE AND ILLUMINATABLE MIRROR DISPLAY DEVICE

(71) Applicant: ICHIKOH INDUSTRIES, LTD., Isehara (JP)

(72) Inventor: Yusuke Kobayashi, Kanagawa (JP)

(73) Assignee: ICHIKOH INDUSTRIES, LTD., Isehara (JP)

( * ) Notice: Subject to any disclaimer, the term of this patent is extended or adjusted under 35 U.S.C. 154(b) by 0 days.

(21) Appl. No.: 17/417,662

(22) PCT Filed: Dec. 26, 2019

(86) PCT No.: PCT/JP2019/051303
§ 371 (c)(1),
(2) Date: Jun. 23, 2021

(87) PCT Pub. No.: WO2020/138367
PCT Pub. Date: Jul. 2, 2020

(65) Prior Publication Data
US 2022/0055541 A1 Feb. 24, 2022

(30) Foreign Application Priority Data
Dec. 26, 2018 (JP) .............................. JP2018-242821

(51) Int. Cl.
*B60R 1/12* (2006.01)
*F21S 43/31* (2018.01)
(Continued)

(52) U.S. Cl.
CPC .............. *B60R 1/1207* (2013.01); *B60R 1/06* (2013.01); *F21S 43/26* (2018.01); *F21S 43/31* (2018.01)

(58) Field of Classification Search
CPC ........... B60R 1/1207; B60R 2001/1215; F21S 43/31; F21S 43/26
See application file for complete search history.

(56) References Cited

U.S. PATENT DOCUMENTS 8,169,307 B2 * 5/2012 Nakamura ........... B60Q 1/2665
340/463
9,440,580 B2 9/2016 Mathieu et al.
(Continued)

FOREIGN PATENT DOCUMENTS

EP 1 970 736 A1 9/2008
JP 2008-534351 A 8/2008
(Continued)

OTHER PUBLICATIONS

International Search Report dated Mar. 24, 2020 in PCT/JP2019/051303 filed Dec. 26, 2019, citing documents AA-AC and AP-AS therein, 4 pages.
(Continued)

*Primary Examiner* — Matthew J. Peerce
(74) *Attorney, Agent, or Firm* — Oblon, McClelland, Maier & Neustadt, L.L.P.

(57) ABSTRACT

A vehicle mirror device includes a mirror housing attached to a vehicle and a mirror that is held by the mirror housing and transmits light from inside of the mirror housing while reflecting light from outside of the mirror housing. The mirror housing accommodates therein a light source, a reflector having a reflective surface that reflects light of the light source, and a mask having a light transmitting part through which the light from the light source reflected by the reflector is projected. The light source and the reflector are arranged so that the light is projected toward the light transmitting part of the mask by one time of reflection, and the reflector is arranged so that the reflected light is projected (Continued)

at an angle with respect to a normal line of a reflective surface of the mirror.

22 Claims, 13 Drawing Sheets

(51) Int. Cl.
    *F21S 43/20*    (2018.01)
    *B60R 1/06*    (2006.01)

(56) References Cited

U.S. PATENT DOCUMENTS

| | | | |
|---|---|---|---|
| 11,098,874 B2 * | 8/2021 | He | F21S 43/26 |
| 2004/0145902 A1 | 7/2004 | Todd et al. | |
| 2006/0215413 A1 | 9/2006 | Mathieu et al. | |
| 2009/0115631 A1 | 5/2009 | Foote et al. | |
| 2018/0137791 A1 | 5/2018 | Osumi et al. | |
| 2018/0370441 A1 * | 12/2018 | Lisowski | F21V 7/0083 |
| 2021/0190283 A1 * | 6/2021 | Iseki | B60Q 1/2665 |

FOREIGN PATENT DOCUMENTS

| | | |
|---|---|---|
| JP | 2012-131277 A | 7/2012 |
| JP | 2014-234019 A | 12/2014 |
| JP | 2014-534601 A | 12/2014 |
| WO | WO 2017/038426 A1 | 3/2017 |

OTHER PUBLICATIONS

Office Action dated Aug. 5, 2022, issued in corresponding European patent application No. 19902653.5.

* cited by examiner

VEHICLE MIRROR DEVICE AND ILLUMINATABLE MIRROR DISPLAY DEVICE

FIELD

The present invention relates to a vehicle mirror device. The present invention also relates generally to the field of a mirror assembly of a vehicle, and more specifically, to an illumination device for illuminating a mirror display part.

BACKGROUND

For example, an optical assembly disclosed in Patent Literature 1 includes a reflector with a reflective surface having a plurality of facets capable of reflecting light in multiple directions, a mask assembly that forms one or more openings and surrounds the reflective surface of the reflector, and a light source surrounded at least between the mask assembly and the reflector, and the plurality of facets direct light from the light source so that the light appear to project from a focal point located outside the assembly. The optical assembly disclosed in Patent Literature 1 is located inside a housing in a mirror assembly of a vehicle door mirror, and displays an icon from inside the mirror through the mirror.

CITATION LIST

Patent Literature

Patent Literature 1: Japanese Translation of PCT International Application Publication No. 2014-534601

SUMMARY

Technical Problem

When the light of the light source is projected onto a mask on which symbols such as signs and letters are applied to illuminate the symbols on a predetermined part, there are a configuration in which the light source is directed to the mask and the light is directly projected onto the mask, and a configuration in which the light of the light source is reflected by the reflector a plurality of number of times and is projected onto the mask. In recent years, a light emitting diode is widely used as a light source.

Here, in the vehicle door mirror, the symbol appears on the outer surface (reflective surface) of the mirror. In the configuration in which the light of the light emitting diode is directly projected onto the mask, when the optical axis of the light emitting diode is arranged in a normal direction perpendicular to the reflective surface, the brightness of the symbol appearing on the reflective surface is high, but the uniformity of the projected light is low. For this reason, when an eye point showing the illuminated symbol is at a position oblique to the reflective surface, such as a driver's seat, a peak of brightness exists in a direction different from the direction toward the eye point, and diffusion occurs with respect to the eye point, resulting in poor projection efficiency. On the other hand, in the configuration in which the light of the light emitting diode is reflected by the reflector a plurality of number of times and is projected onto the mask, the uniformity of the projected light with respect to the eye point is higher than that in the former case, but a loss occurs due to multiple number of times of reflection and the optical axis of the light emitting diode is directed to the opposite side of the symbol of the mask, resulting in poor projection efficiency. When the projection efficiency is poor, since it becomes difficult to recognize the display of the symbol, the luminous flux of the light source is accordingly set to be high and power consumption increases.

The present invention has been made to solve the problems described above and an object of the present invention is to provide a vehicle mirror device capable of improving projection efficiency.

Furthermore, it is known to provide an illumination indicator on a rearview mirror of a vehicle. For example, the rearview mirror may incorporate therein an illumination direction indicator, a brake light indicator, and a blind spot warning indicator. In general, the illumination indicator is provided by an illumination unit contained in a mirror housing and is mounted on the back side of the mirror. Light produced by a light source in the illumination unit is directed by an optical element to exit the illumination unit and pass through the mirror so that a driver can see the light on the front side of the mirror. Consequently, the illumination unit should be small enough to be contained in the mirror housing, but should be large enough to accommodate therein the light source as well as electronic and optical components. Moreover, the electronic components within the illumination unit should be accessible to connect to wiring of the vehicle.

To satisfy these requirements, an illumination unit in the related art generally includes a specular reflector, and other optical elements that guide light from a light source along a predetermined path of the illumination unit and allow the light to exit the unit and illuminate an indicator on a mirror. However, such a device is complicated and may provide uneven illumination of the indicator.

Furthermore, one object of an embodiment disclosed herein is to provide an illumination device for solving the problems described in the background described above and illuminating a mirror display part.

Furthermore, another object is to provide a compact illumination device that provides uniform illumination of the mirror display part.

These and other objects are achieved by various aspects of the disclosed invention including the followings.

Solution to Problem

To achieve the above-described object, a vehicle mirror device according to an aspect of the present invention includes a mirror housing attached to a vehicle; and a mirror that is held by the mirror housing and transmits light from inside of the mirror housing while reflecting light from outside of the mirror housing. The mirror housing accommodates therein a light source, a reflector having a reflective surface that reflects light of the light source, and a mask having a light transmitting part through which the light from the light source reflected by the reflector is transmitted. The light source and the reflector are arranged so that the light is projected toward the light transmitting part of the mask by one time of reflection, and the reflector is arranged so that the reflected light is projected at an angle with respect to a normal line of a reflective surface of the mirror.

Further, it is preferable to include a wall surface that guides light that is emitted from the light source but is not directed to the reflector, toward the reflective surface of the reflector without blocking light that is emitted from the light source and enters the reflector as well as light that is reflected by the reflector and is projected toward the light transmitting part of the mask.

Further, it is preferable that an optical axis of the light source is arranged to be inclined toward the reflective surface of the reflector.

Advantageous Effects of Invention

According to the present invention, the light of the light source is configured to be transmitted through the light transmitting part of the mask by one time of reflection of the reflector, so that it is possible to improve projection efficiency as compared with a configuration in which the light is reflected a plurality of number of times by a plurality of reflectors. In addition, the reflector is arranged so that the reflected light is projected at an angle with respect to the normal line of the reflective surface of the mirror, whereby the light transmitted through the light transmitting part of the mask can be linearly projected toward a predetermined position, and projection efficiency can be improved for the predetermined position as compared with a configuration in which light is projected in the normal direction of the reflective surface of the mirror. As a result, it is possible to reduce power consumption of the light source.

DESCRIPTION OF EMBODIMENTS

Figure 1:
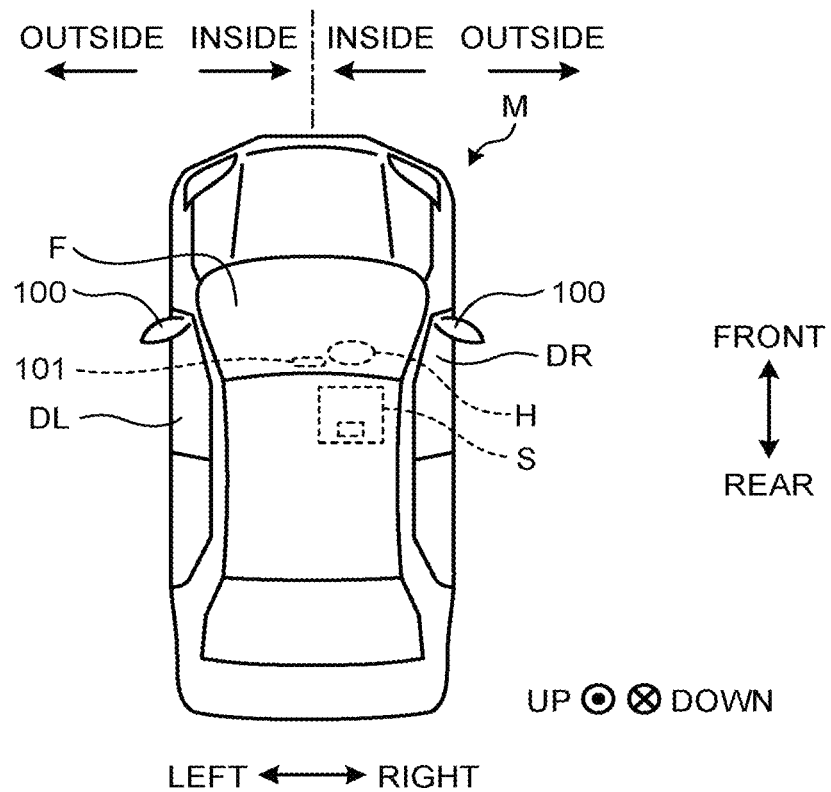
FIG. 1 is a plan view illustrating an example of a vehicle including vehicle mirror devices according to the present embodiment.

Hereinafter, embodiments according to the present invention will be described with reference to the drawings. Note that the present invention is not limited by the embodiments. Furthermore, components in the following embodiments include those that can be easily replaced by a person skilled in the art, or those that are substantially the same.

In the following description, each of the front-rear, the up-down, and the left-right directions is the direction in a vehicle mounted state in which a vehicle mirror device is mounted on a vehicle, and indicates the direction when a vehicle travel direction is viewed from a driver's seat. Note that in the present embodiment, it is assumed that the up-down direction is parallel to a vertical direction and the left-right direction is a horizontal direction. Furthermore, in the drawings, viewing from above is referred to as a plan vision and the drawing thereof is referred to as a plan view, and viewing from rear is referred to as a front vision and the drawing thereof is referred to as a front view.

FIG. 1 is a plan view illustrating an example of a vehicle M including vehicle mirror devices 100 and 101 according to the present embodiment. As illustrated in FIG. 1, the vehicle mirror devices 100 are what is called door mirrors and are attached to left and right doors DL and DR of the vehicle M and the outside of the vehicle M. The left and right vehicle mirror devices 100 are substantially symmetrical in the left-right direction. Furthermore, as illustrated in FIG. 1, the vehicle mirror device 101 is what is called a rearview mirror and is attached to an upper side of a windshield F and the inside of the vehicle M. In the present embodiment, as the vehicle M, a vehicle in which a steering wheel H is arranged in a right seat (driver's seat) S will be described as an example.

Figure 2:
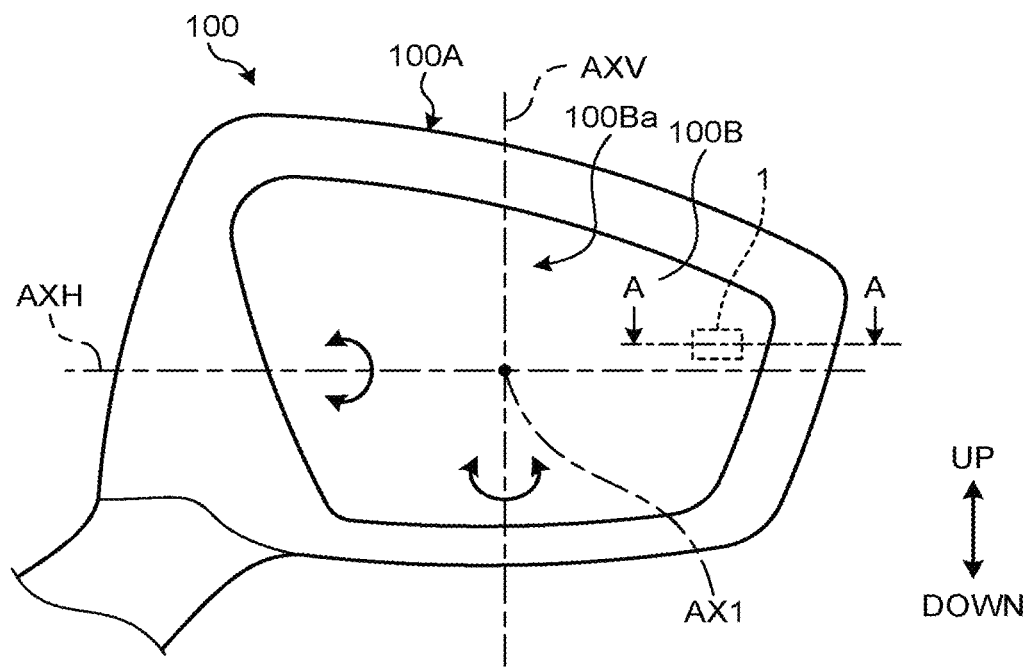
FIG. 2 is a front view of the vehicle mirror device according to the present embodiment.
Figure 3:
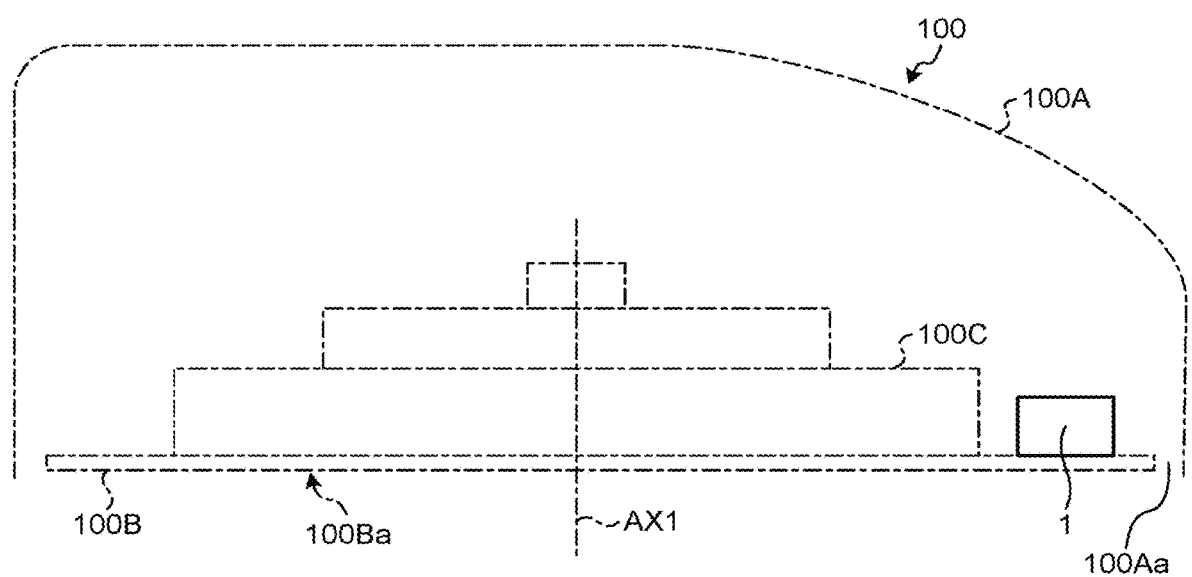
FIG. 3 is a plan sectional view illustrating an example of the vehicle mirror device according to the present embodiment.

FIG. 2 is a front view of the vehicle mirror device 100 according to the present embodiment. FIG. 3 is a plan sectional view illustrating an example of the vehicle mirror device 100 according to the present embodiment. FIG. 2 and FIG. 3 illustrate the vehicle mirror device 100 configured as a door mirror. Furthermore, FIG. 2 and FIG. 3 illustrate the door mirror on the right side of the vehicle M illustrated in FIG. 1.

The vehicle mirror device 100 has a mirror 100B, a mirror housing 100A that holds the mirror 100B and is attached to the vehicle M illustrated in FIG. 1, a mirror driving unit 100C, and a lamp unit 1.

The mirror housing 100A is attached to the left and right doors DL and DR of the vehicle M. The housing 100A is configured as a box body whose front side is opened. The mirror housing 100A is pivotally provided about an axis (vertical axis), which is perpendicular to the vertical direction, by a rotation driving source (not illustrated).

The mirror 100B is formed in a plate shape by using, for example, glass, resin, or the like. The mirror 100B is arranged to cover an opening 100Aa of the mirror housing 100A. The mirror 100B is configured to transmit light from the inside of the mirror housing 100A while reflecting light from outside of the mirror housing 100A coming from the rear side of the vehicle M. Accordingly, the mirror 100B can show the state on the rear side of the vehicle M on the left and right sides (right side in the drawing) illustrated in FIG. 1 to a person who sits in the seat (driver's seat) S.

The mirror driving unit 100C supports the mirror 100B with respect to the mirror housing 100A, and adjusts an angle of the mirror 100B. The mirror driving unit 100C is arranged in the mirror housing 100A. The mirror driving unit 100C has a driving source and a transfer mechanism, and transfers driving force of the driving source to the mirror 100B by the transfer mechanism, thereby changing the angle of the mirror 100B and changing the direction of a reflective surface (mirror surface) 100Ba that is an outer surface of the mirror 100B.

As illustrated in FIG. 2, the mirror driving unit 100C can rotate the mirror 100B in a predetermined movable range, for example, in an axial direction of a vertical axis AXV and in an axial direction of a horizontal axis AXH. With this, by combining the adjustment in the axial direction of the vertical axis AXV and the adjustment in the axial direction of the horizontal axis AXH, it is possible to direct the reflective surface 100Ba of the mirror 100B in a desired direction. Note that the vertical axis AXV is a virtual straight line parallel to the vertical direction. The horizontal axis AXH is a virtual straight line orthogonal to the vertical axis AXV and to a reflection optical axis AX1 of a light reflection region.

Figure 4:
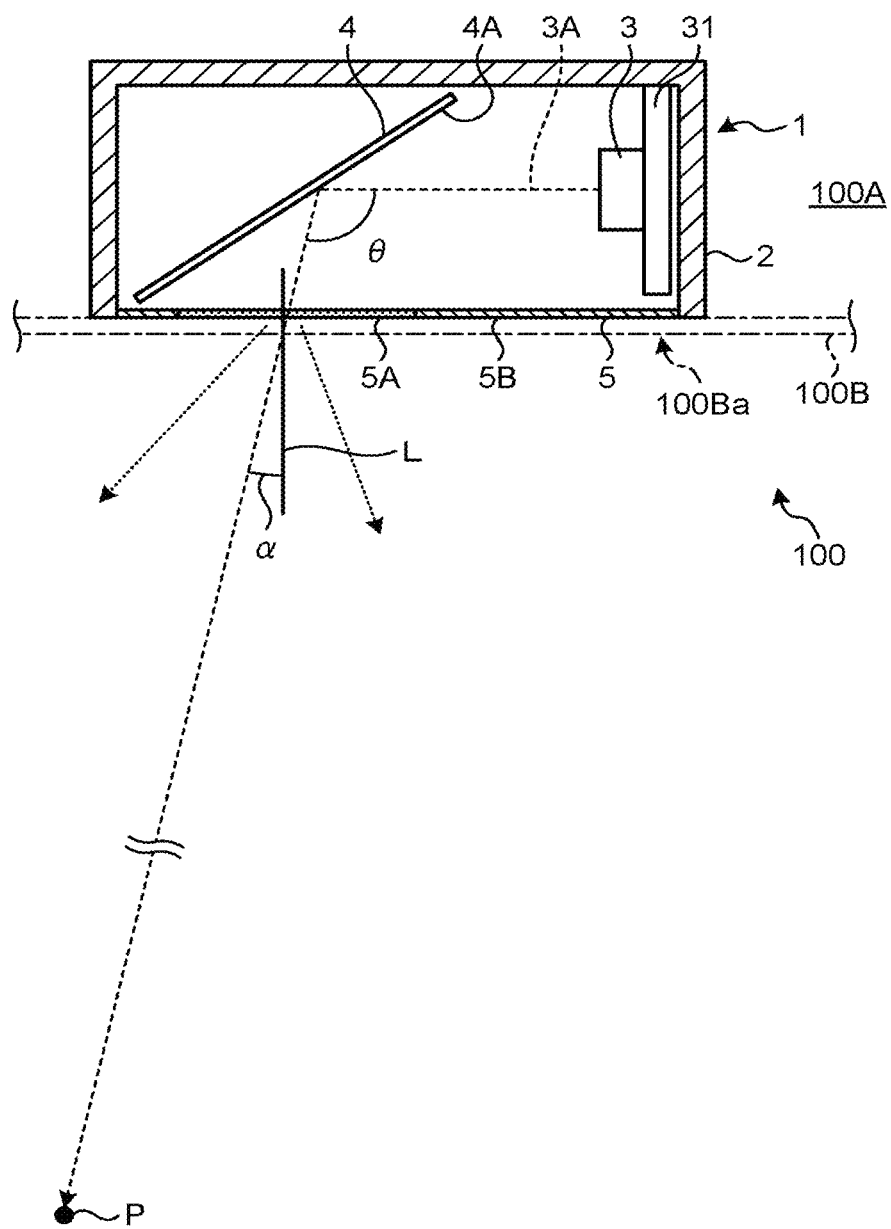
FIG. 4 is an enlarged plan sectional view illustrating an example of a lamp unit of the vehicle mirror device according to the present embodiment.

FIG. 4 is an enlarged plan sectional view (section taken along line A-A in FIG. 2) illustrating an example of the lamp unit 1 of the vehicle mirror device 100 according to the present embodiment.

The lamp unit 1 is fixed to a back surface of the mirror 100B (inner surface of the mirror housing 100A). The lamp unit 1 is fixed to the back surface of the mirror 100B with a double-sided tape, for example. When the angle of the mirror surface of the mirror 100B is adjusted by the mirror driving unit 100C described above, an angle of the lamp unit 1, together with the mirror surface of the mirror 100B, is changed.

The lamp unit 1 has a casing 2, a light source 3, a reflector 4, and a mask 5.

The casing 2 is configured as a box body covered with a wall surface that blocks light and opens only on a front side. The casing 2 is provided so that the light source 3 and the reflector 4 are accommodated in the box body and the mask 5 covers the opening.

The light source 3 is a light emitting diode (LED), and is mounted on a substrate 31 accommodated in the casing 2.

The reflector 4 has a reflective surface 4A that reflects light of the light source 3.

The mask 5 is formed in a plate shape so as to cover the opening of the casing 2. The mask 5 has a light transmitting part 5A that transmits light, and a part other than the light transmitting part 5A is configured as a non-light transmitting part 5B that does not transmit light or diffuses light. The light transmitting part 5A is transparent or translucent and may be configured as a sheet or a lens. In the light transmitting part 5A, a symbol is formed so that transmitted light is projected in a predetermined shape. The non-light transmitting part 5B is, for example, made of a milky white material, is subjected to embossing for forming fine irregularities, or is made of a light diffusing material. The mask 5 allows the light transmitting part 5A to transmit the light of the light source 3, which is reflected by the reflector 4, to the outside of the casing 2. Then, the light transmitted through the light transmitting part 5A is projected so that the shape of the symbol, which is formed by the light transmitting part 5A, appears on the reflective surface 100Ba that is the outer surface of the mirror 100B.

In the lamp unit 1 having the above configuration, the light source 3 and the reflector 4 are arranged so that the light of the light source 3 is projected onto the mask 5 by one time of reflection on the reflective surface 4A of the reflector 4. Specifically, the light source 3 is arranged so that an optical axis 3A of the light source 3 is along the mask 5. Then, the light of the light source 3 is reflected by the reflective surface 4A of the reflector 4 at an obtuse angle θ with respect to the optical axis 3A, and is transmitted through the light transmitting part 5A of the mask 5 by this one time of reflection. Furthermore, the light source 3 and the reflector 4 are arranged so that the light from the light source 3 transmitted through the light transmitting part 5A of the mask 5 reaches the mirror 100B without hitting the mirror driving unit 100C, that is, the light from the light source 3 avoids the mirror driving unit 100C.

Furthermore, in the lamp unit 1 having the above configuration, the reflector 4 is arranged so that the reflected light is projected at an angle α with respect to a normal line L of the reflective surface 100Ba of the mirror 100B. The angle α is, for example, an angle based on a predetermined position (referred to as an eye point) P seen by a person who sits in the seat (driver's seat) S of the vehicle M illustrated in FIG. 1.

Figure 5:
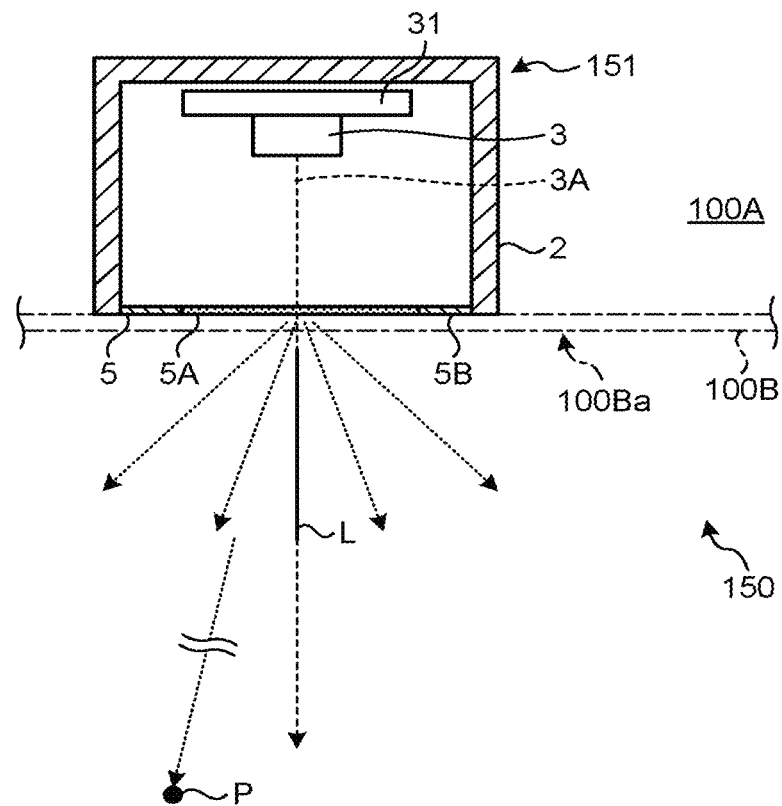
FIG. 5 is an enlarged plan sectional view illustrating a lamp unit of a comparative example.
Figure 6:
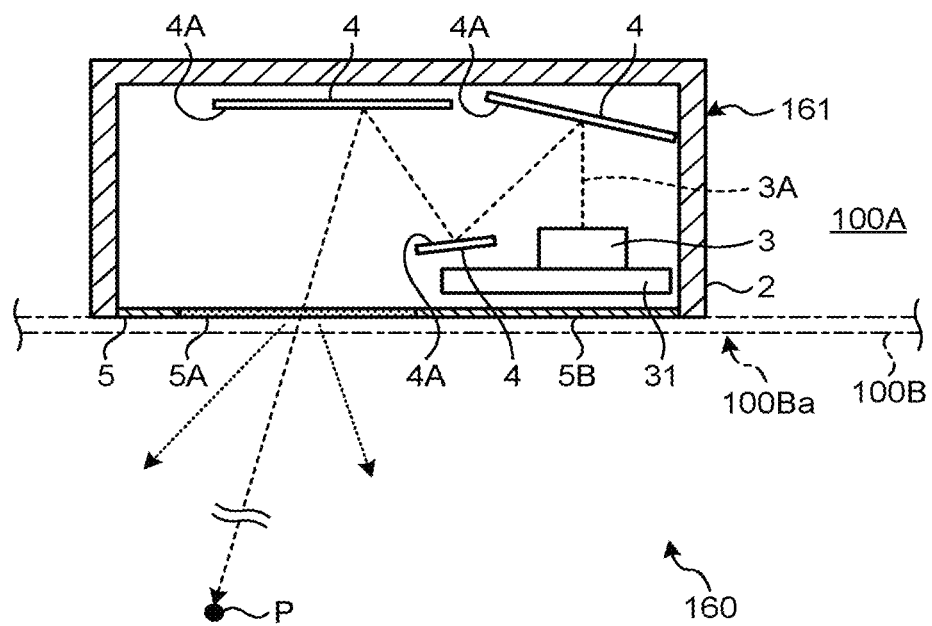
FIG. 6 is an enlarged plan sectional view illustrating a lamp unit of a comparative example.

FIG. 5 and FIG. 6 are enlarged plan sectional views illustrating lamp units 151 and 161 of comparative examples.

In FIG. 5, in a vehicle mirror device 150 of the comparative example, the same components as those of the vehicle mirror device 100 of the present embodiment are denoted by the same reference numerals. The vehicle mirror device 150 of the comparative example is different from the vehicle mirror device 100 of the present embodiment in that in the lamp unit 151, there is no reflector 4 and the light source 3 is arranged so that light is directly transmitted through the light transmitting part 5A of the mask 5, and the optical axis 3A is aligned with the direction of the normal line L of the reflective surface 100Ba of the mirror 100B.

According to the vehicle mirror device 150 of the comparative example illustrated in FIG. 5, when the optical axis 3A of the light source 3 is arranged in the direction of the normal line L perpendicular to the reflective surface 100Ba of the mirror 100B, the brightness of a symbol appearing on the reflective surface 100Ba is high, but the uniformity of projected light is low. In addition, since the eye point P is in the direction inclined to the normal line L of the reflective surface 100Ba of the mirror 100B, a peak of the brightness exists in a direction different from the direction toward the eye point P, and diffusion occurs to the eye point P, resulting in poor projection efficiency. When the projection efficiency is poor, since it becomes difficult to recognize the display of the symbol, the luminous flux of the light source 3 is accordingly set to be high and power consumption increases.

On the other hand, in FIG. 6, in a vehicle mirror device 160 of the comparative example, the same components as those of the vehicle mirror device 100 of the present embodiment are denoted by the same reference numerals. The vehicle mirror device 160 of this comparative example is different from the vehicle mirror device 100 of the present embodiment in that the lamp unit 161 is configured so that the light of the light source 3 is reflected a plurality of number of times by a plurality of reflectors 4 and then transmitted through the light transmitting part 5A of the mask 5.

According to the vehicle mirror device 160 of the comparative example illustrated in FIG. 6, in the configuration in which the light of the light source 3 is reflected a plurality of number of times by the reflectors 4 and projected onto the mask, the light transmitted through the light transmitting part 5A of the mask 5 can be directed to the eye point P, so that the uniformity of projected light to the eye point P is higher than that of the vehicle mirror device 150 of the comparative example illustrated in FIG. 5. However, a loss occurs due to multiple number of times of reflection of the light of the light source 3 and the optical axis 3A of the light source 3 is directed to the opposite side of the light transmitting part 5A of the mask 5, resulting in poor projection efficiency. When the projection efficiency is poor, since it becomes difficult to recognize the display of the symbol, the luminous flux of the light source 3 is accordingly set to be high and power consumption increases.

In this regard, in the vehicle mirror device 100 of the present embodiment, the light source 3 and the reflector 4 are arranged so that light is projected toward the light transmitting part 5A of the mask 5 by one time of reflection, and the reflector 4 is arranged so that the reflected light is projected at an angle with respect to the normal line L of the reflective surface 100Ba of the mirror 100B.

Consequently, the vehicle mirror device 100 of the present embodiment is configured so that the light of the light source 3 is transmitted through the light transmitting part 5A of the mask 5 by one time of reflection of the reflector 4. With this, it is possible to improve projection efficiency as compared with the vehicle mirror device 160 of the comparative example illustrated in FIG. 6. Furthermore, the reflector 4 is arranged so that the reflected light is projected at an angle with respect to the normal line L of the reflective surface 100Ba of the mirror 100B. With this, the light transmitted through the light transmitting part 5A of the mask 5 can be linearly projected toward the eye point P, and projection efficiency can be improved for the eye point P as compared with the vehicle mirror device 150 of the comparative example illustrated in FIG. 5 and the vehicle mirror device 160 of the comparative example illustrated in FIG. 6. As a consequence, it is possible to reduce power consumption of the light source 3.

Figure 7:
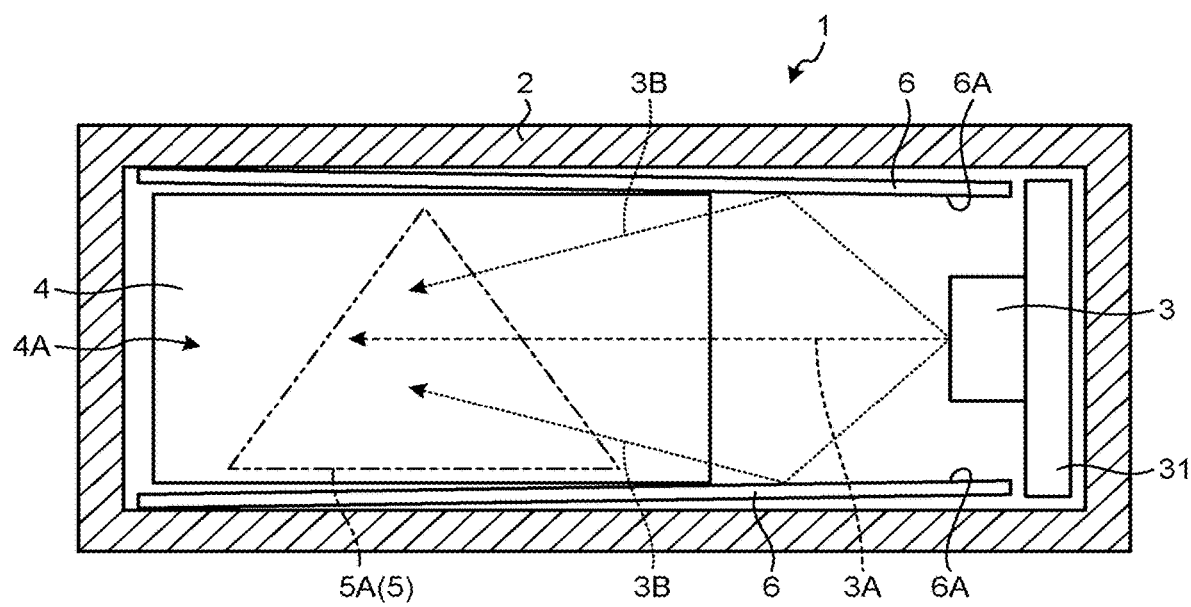
FIG. 7 is an enlarged front sectional view illustrating another example of a lamp unit.

FIG. 7 is an enlarged front sectional view illustrating another example of the lamp unit 1.

As illustrated in FIG. 7, the vehicle mirror device 100 of the present embodiment has wall surfaces 6A inside the casing 2 in the lamp unit 1. The wall surface 6As are surfaces of wall materials 6 and are configured to reflect or diffuse light. Specifically, the wall surfaces 6A are, for example, colored in white or light gray so as to reflect or diffuse light. The wall materials 6 forming the wall surfaces 6A are each formed in a plate shape. The wall surfaces 6A are arranged inside the casing 2, without blocking light that is emitted from the light source 3 and enters to the reflector 4 as well as light that is reflected by the reflector 4 and is projected toward the light transmitting part 5A of the mask 5. In FIG. 7, the light transmitting part 5A is illustrated as a triangular symbol. Moreover, the wall surfaces 6A are arranged to guide light 3B, which is emitted from the light source 3 but is not directed to the reflector 4, toward the reflective surface 4A of the reflector 4 by reflecting or diffusing the light 3B. Specifically, the wall surface 6A is formed with a plane inclined or curved with respect to the optical axis 3A of the light source 3 so as to guide the light 3B, which is emitted from the light source 3 but is not directed to the reflector 4, toward the reflective surface 4A of the reflector 4. Preferably, the wall surface 6A is arranged to allow the light 3B, which is emitted from the light source 3 but is not directed to the reflector 4, to reach the light transmitting part 5A of the mask 5 by reflecting the light 3B by the reflective surface 4A of the reflector 4.

Consequently, according to the vehicle mirror device 100 of the present embodiment, the wall surface 6A guides the light 3B, which is emitted from the light source 3 but is not directed to the reflector 4, toward the reflective surface 4A of the reflector 4. This increases light reflected by the reflector 4 and reaching the light transmitting part 5A of the mask 5. As a consequence, it is possible to reduce uneven brightness of the symbol that appears on the reflective surface 100Ba of the mirror 100B by passing through the light transmitting part 5A and to improve uniformity. As a consequence, it is possible to improve the visibility and design property of the symbol appearing on the reflective surface 100Ba of the mirror 100B.

Note that the wall surface 6A may be configured on the inner surface of the casing 2.

Figure 8:
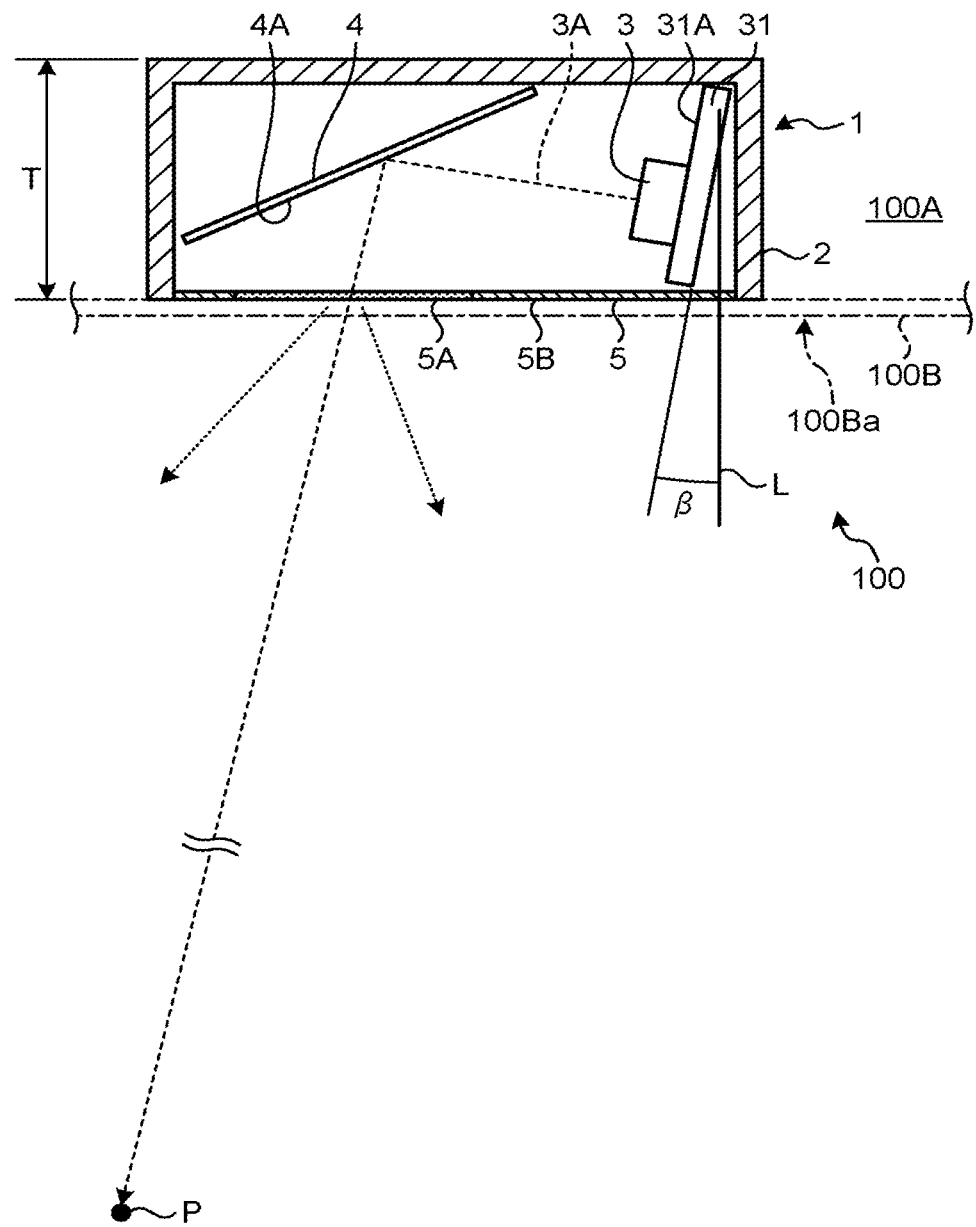
FIG. 8 is an enlarged plan sectional view illustrating another example of a lamp unit.

FIG. 8 is an enlarged plan sectional view illustrating another example of the lamp unit 1.

As illustrated in FIG. 8, it is preferable that a reference surface 31A orthogonal to the optical axis 3A of the light source 3 be arranged to be inclined toward the reflective surface 4A of the reflector 4. Although the reference surface 31A is illustrated as a surface of the substrate 31 on which the light source 3 is mounted in FIG. 8, it may be a virtual surface orthogonal to the optical axis 3A of the light source 3. That is, in other words, the optical axis 3A of the light source 3 is arranged to be inclined toward the reflective surface 4A of the reflector 4 in a direction away from the light transmitting part 5A of the mask 5. In such a case, the reflector 4 adjusts the direction of the reflective surface 4A according to the arrangement of the light source 3 so that the light from the light source 3 reflected by the reflective surface 4A passes through the light transmitting part 5A of the mask 5 and is directed to the eye point P.

Consequently, according to the vehicle mirror device 100 of the present embodiment, the light source 3 and the substrate 31 on which the light source 3 is mounted are arranged to be inclined toward the reflector 4 side. With this, it is possible to reduce the dimension of the lamp unit 1 (dimension of the casing 2) in the front-rear direction of the vehicle M and to reduce the size of the lamp unit 1. For example, by tilting an angle β of inclination of the light source 3 (the reference surface 31A) with respect to the normal line L of the reflective surface 100Ba of the mirror 100B by 10°, it contributes to reducing the dimension of the lamp unit 1 (the casing 2) in the front-rear direction of the vehicle M by 5%.

Note that, in the aforementioned embodiment, the vehicle mirror device 100 serving as a door mirror has been illustrated and described; however, the present invention is not limited thereto. For example, by providing the lamp unit 1 to the vehicle mirror device 101 serving as a rearview mirror in the same manner, it is possible to acquire the same operations and effects.

Next, other embodiments will be described.

The concept of the present invention is best described using specific embodiments of the present invention. The specific embodiments are described in detail herein with reference to the accompanying drawings and the same reference numerals refer to the same features throughout the drawings. As used herein, it should be understood that the term "invention" is intended to mean the concept of the present invention, which is the basis of the embodiments to be described below, rather than meaning merely the embodiments. It should be understood that the overall concept of the invention is not limited to the exemplary embodiments to be described below and the following description should be read in such a viewpoint.

In addition, the word "exemplary" is used to mean "serving as an example, instance, or illustration" herein. Any embodiment described as being exemplary herein, such as construction, process, design, and technique, is not necessarily to be construed as being preferred or advantageous over other embodiments. The particular quality or suitability of examples illustrated herein is not intended and should not be inferred.

Figure 9:
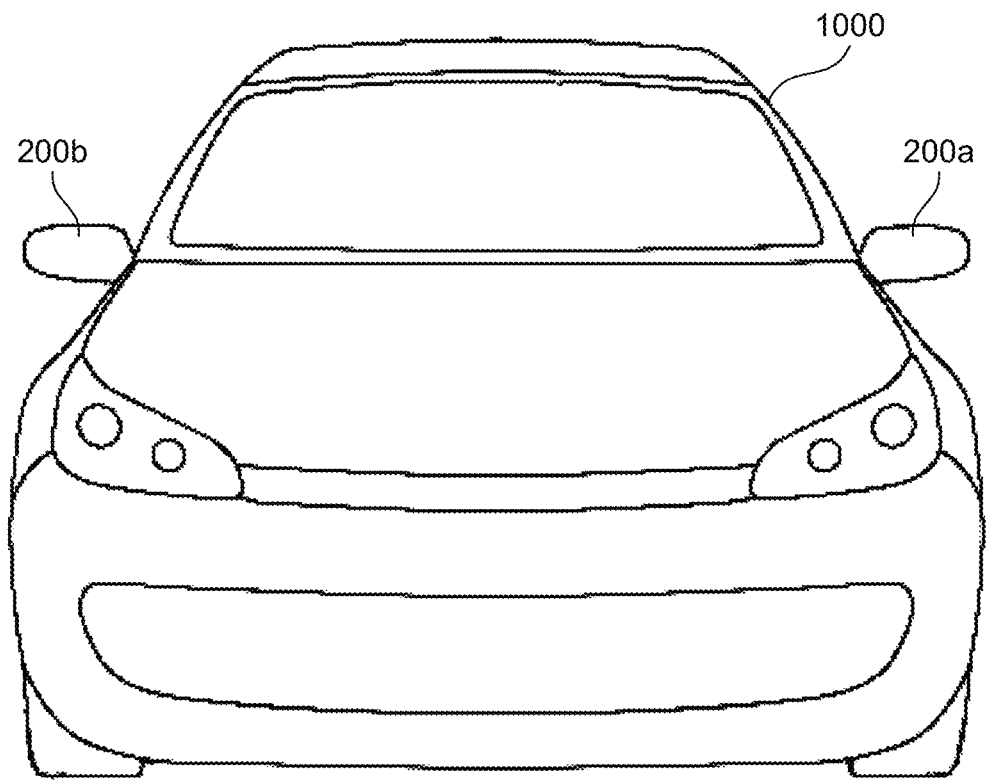
FIG. 9 is a front end view of an exemplary motor vehicle capable of implementing an embodiment of the present disclosure.

FIG. 9 is a front end view of an exemplary motor vehicle capable of implementing an embodiment of the present invention to be disclosed. A motor vehicle 1000 includes two mirror assemblies 200a and 200b, and is representatively referred to as a mirror assembly 200 herein. Although the motor vehicle 1000 is illustrated as a passenger car, it should be understood that the present invention is not limited thereto. Other motor vehicles including motorcycles, busses, trucks, and the like of all sizes may implement the present invention as will be apparent to a person skilled in the art when considering the present disclosure. Moreover, the embodiments disclosed herein are applicable to any mirrors of vehicles, such as rearview mirrors.

Figure 10:
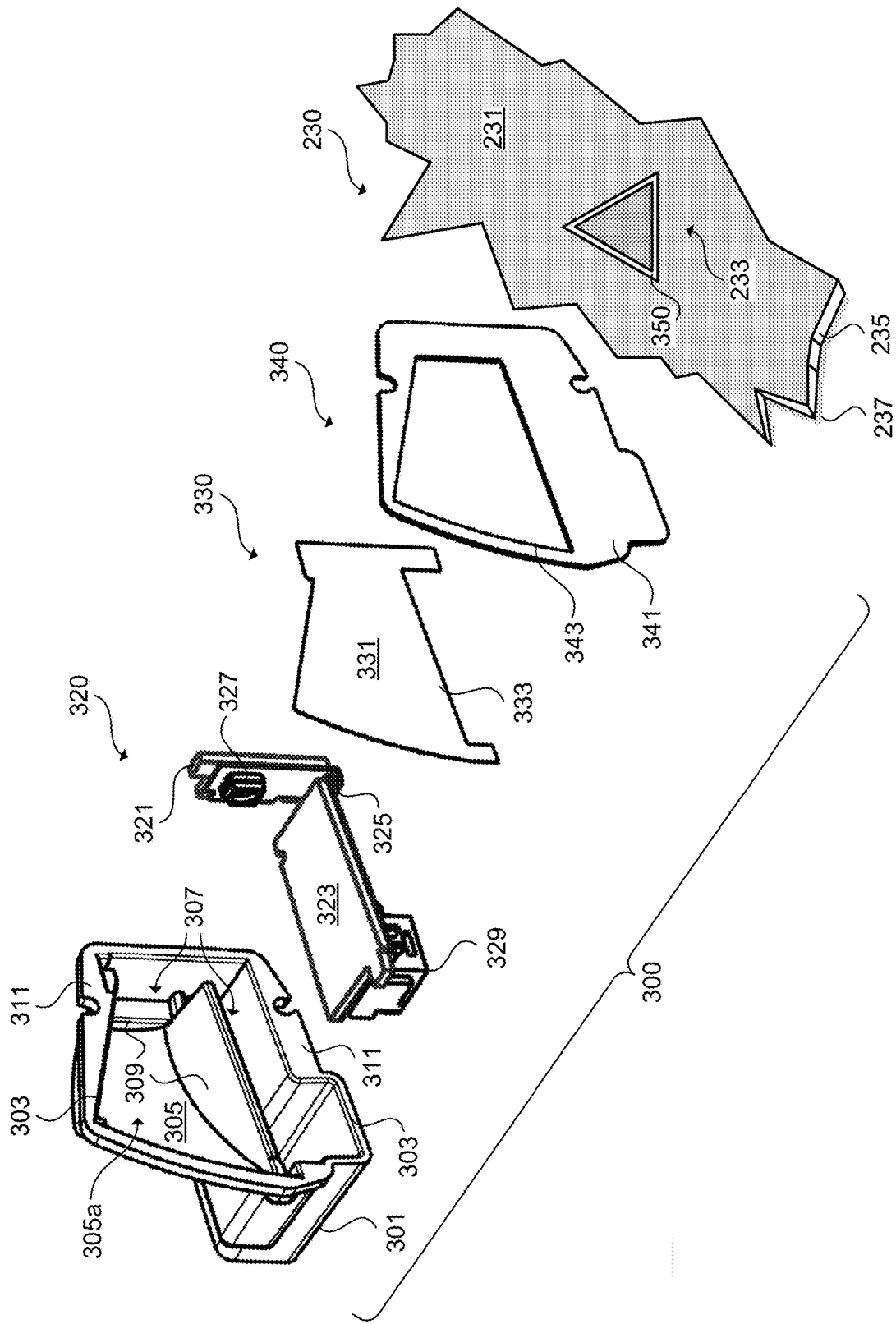
FIG. 10 is an exploded assembly view of an exemplary illuminatable mirror display device according to an embodiment of the present disclosure.

The mirror assembly 200 includes a casing (not illustrated), a vehicle mounting arm (not illustrated), a mirror 230 having an outer surface 231 and a display region 233, and a mirror display part 350 within the region 233 of the mirror 230, and is provided with an illuminatable mirror display device 300 as illustrated in FIG. 10. The vehicle mounting arm is used to mount the casing on the vehicle 1000 by a known method. The mirror 230 covers an opening of the casing, and provides a casing in which the illuminatable mirror display device 300 is contained. The outer surface 231 provides a viewer with a high reflective appearance, and the display region 233 includes the display part 350 illuminated by a light source contained in the illuminatable mirror display device 300. The display part 350 (illustrated in a triangular shape) and the housing of the mirror display device 300 are clearly visible. However, the display part 350 is preferably visible only in an illuminated state, and the housing of the mirror display device 300 is preferably invisible in both an illuminated state and a non-illuminated state.

The mirror display part 350 may have an aesthetic or functional purpose. For example, the mirror display part 350 may provide a driver who visually recognizes the mirror 230 with a visual stimulus for warning a certain condition, and the visual stimulus prompts the driver to act according to the condition. One specific example is a blind-spot indicator that uses the display part 350 to warn a driver of the presence of a vehicle in the "blind spot" of a vehicle. The light source located on the back of the mirror 230 may illuminate the display region 233 when an object is detected in the blind spot of the vehicle, which causes the display part 350 to be illuminated. The light source may remain in an ON state or generate intermittent flashes so that the display part 350 shows the flashes to the vehicle driver.

FIG. 10 is an exploded assembly view of the illuminatable mirror display device 300 according to one exemplary embodiment of the present disclosure. The illuminatable mirror display device 300 includes a housing 301, a circuit assembly 320, a lighting diffuser 330, an adhesive unit 340, and the mirror display part 350. A part of the mirror 230 incorporating the mirror display part 350 in the embodiment of FIG. 10 is also illustrated.

The housing 301 accommodates therein the light source as well as other electronic components and optical components, and functions to reflect light from the light source so that reflected light exits the housing 301. The housing 301 has an opening, and the opening is formed by an opening edge 303 that defines an opening surface of the housing 301. A reflective cavity 305 is defined by at least one reflective surface 305a facing the opening surface formed by the opening edge 303, whereby light is reflected toward the opening surface as will be further described below. Various electronic components associated with the illuminatable mirror display device 300 are arranged in a circuit cavity 307. The circuit cavity 307 is shaped as a whole to accommodate therein the circuit assembly 320 of a similar shape.

As illustrated in FIG. 10, the reflective cavity 305 and the circuit cavity 307 are roughly separated by partition 309. The partition 309 extends from the reflective surface 305a along a partition surface intersecting the opening surface. The partition 309 may be provided in a divided manner within each partition surface intersecting the opening surface. In the embodiment of FIG. 10, a part of the partition 309 does not extend to the opening surface as a whole, so that light entered through the opening is input between the reflective cavity 305 and the circuit cavity 307 as will be further described below. A flange 311 extends outward from the opening edge 303 substantially along the opening surface, whereby the housing 301 is configured to be attached to a flat base such as the mirror 230.

The circuit assembly 320 is configured to accommodate therein an electric circuit associated with the illuminatable mirror display device 300. In the embodiment of FIG. 10, the circuit assembly 320 contains a first circuit board 321, a second circuit board 323, and wiring 325. The circuit boards 321 and 323 may be a rigid, semi-rigid, or flexible base configured to support elements to form the electric circuit. For example, the circuit boards 321 and 323 may include electric lands, mounting pads, via holes or similar structures for mounting separate electric components, and/or integrated circuits on the circuit boards. The wiring 325 provides electric connection between the first circuit board 321 and the second circuit board 323 by a known method.

In the embodiment of FIG. 10, the first circuit board 321 includes a light source 327 attached thereto. The light source 327 may be a light emitting diode (LED) that emits light of any suitable color (for example, red or yellow). However, any suitable source that emits light may be used as the light source 327. The second circuit board 323 includes a connector 329 attached thereto and configured to connect to a corresponding connector of a vehicle wiring harness. The circuit boards 321 and 323 and the wiring 325 provide suitable electric connection between the light source 327 and the connector 329. In the embodiment of FIG. 10, the circuit assembly 320 is provided in a roughly "L" shaped configuration so that the circuit assembly 320 can be accommodated within the circuit cavity 307 of the housing 301. In the embodiment of FIG. 10, the housing 301 and the circuit assembly 320 together form an illumination device configured to illuminate the mirror display part 350.

Figure 11:
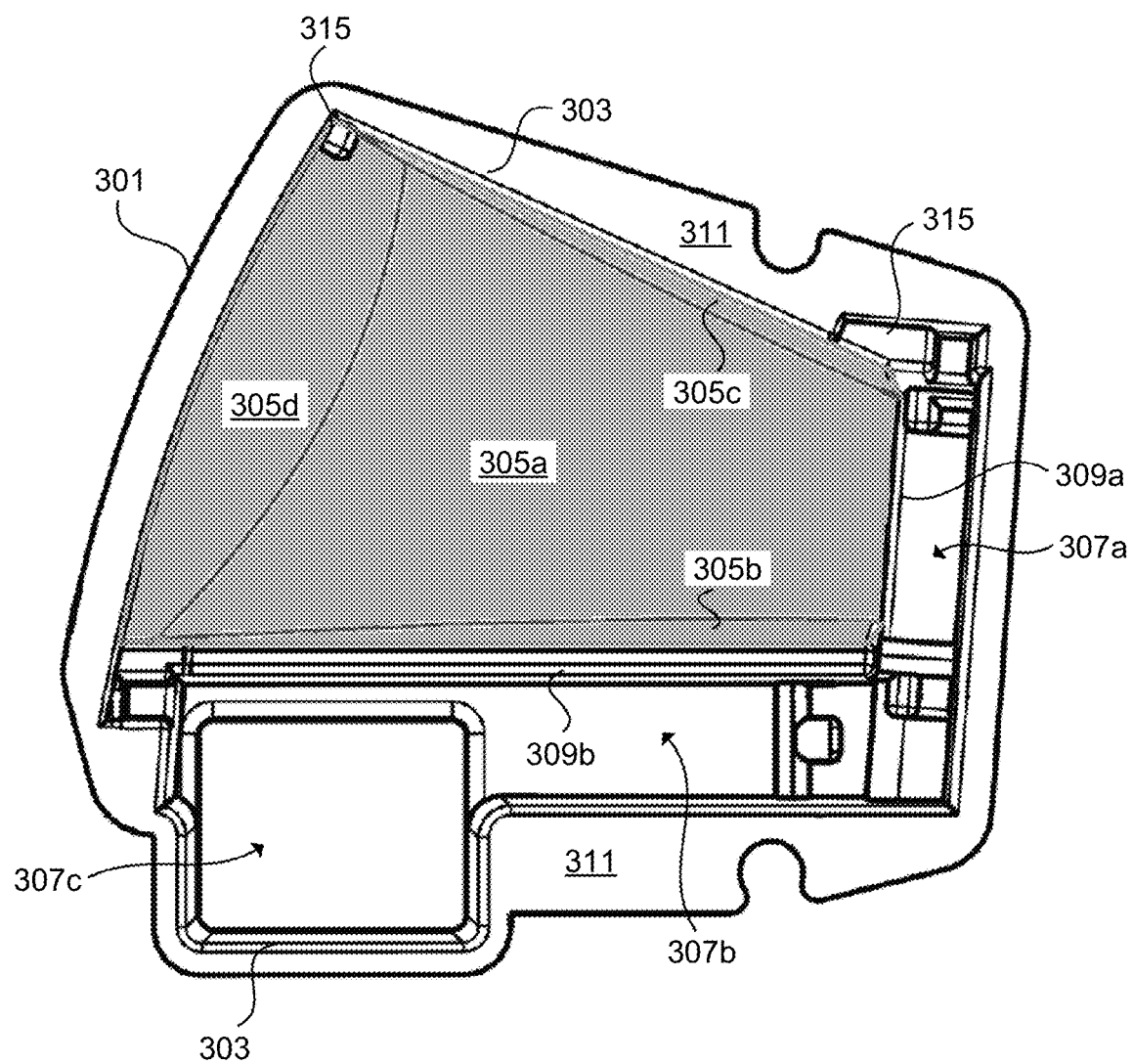
FIG. 11 is a plan view illustrating details of the inside of a housing of the exemplary illuminatable mirror display device illustrated in FIG. 10.

FIG. 11 is a plan view illustrating the inside of the housing of FIG. 10, and the reflective cavity 305 is shaded to show a boundary with the circuit cavity 307. As illustrated, the reflective cavity 305 is defined by the reflective surface 305a, and side surfaces 305b, 305c, and 305d extending from the reflective surface 305a to the opening edge 303 of the housing. In the housing 301, the circuit cavity 307 includes cavity parts 307a to 307c for accommodating therein the circuit assembly 320. More specifically, the cavity parts 307a to 307c are configured to accommodate therein the first circuit board 321, the second circuit board 323, and the connector 329, respectively. The partition 309 include a first partition segment 309a and a second partition segment 309b in order to separate the reflective cavity 305 from the circuit cavity 307. Since the first partition segment 309a does not extend to the housing opening as a whole, when the circuit assembly 320 is inserted into the housing 301, light from the light source 327 can enter the reflective cavity 305. The second partition segment 309b extends from the reflective surface 305a to the opening surface. FIG. 10 best illustrates the relative protrusion of the partition segments 309a and 309b from the reflective surface 305a of the housing.

The reflective surface 305a faces as a whole the opening surface formed by the opening edge 303 and includes a granular surface, whereby light incident on the granular surface is diffused in a direction toward the opening surface as a whole and exits the housing 301. When the housing is made of a material having reflective properties, the reflective surface 305a is left uncoated. For example, white ABS plastic may be used to form the housing 301, which can expose the granular reflective surface 305a and diffuse light incident thereon. Alternatively, the granular surface may be coated with a layer of a material that improves the reflectance of the reflective surface 305a.

At least one of the side surfaces 305a, 305b, and 305c may be reflective surfaces that guide at least some light toward the opening surface of the housing. Consequently, at least one of the side surfaces 305a, 305b, and 305c may be granular surfaces that diffuse light, and/or may be coated with a reflective material. In some embodiments, the side surfaces are processed to simplify the manufacturing of the housing 301, regardless of the optical effects of the processing. For example, even when the side surfaces 305a, 305b, and 305c are not designed to reflect light and contribute to illuminating the mirror display part 350, at least one of such side surfaces may be granular to simplify the formation of the granular surface on the reflective surface 305a. Similarly, at least one of the side surfaces 305a, 305b, and 305c may include a reflective coating in order to simplify a process of coating the reflective surface 305a.

The housing 301 may be manufactured by injection molding of plastics such as ABS, but other manufacturing methods may also be used. In the case of the injection molding, a mold is formed to have a granular surface corresponding to the reflective surface 305a of the housing, as will be further described below. In such an embodiment, at least one of the side surfaces 305b, 305c, and 305d may include a smooth surface to facilitate the removal of the housing 301 from the injection molding mold. As illustrated in FIG. 11, a support surface 315 is provided to support the lighting diffuser 330 when a device is assembled.

Referring again to FIG. 10, the lighting diffuser 330 is optionally provided to diffuse light output from the reflective cavity 305. The lighting diffuser 330 includes a body 331 made of suitable material and thickness and diffuses light passing through the body. An edge 333 of the lighting diffuser 330 is shaped to be accommodated in the housing 301.

The adhesive element 340 is provided to fix the housing 301 to the back side of the mirror 230, whereby the electric circuit assembly (circuit assembly) 320 and the lighting diffuser 330 are included in a space between the mirror 230 and the housing 301. The adhesive element 340 includes a frame 341 suitably shaped to contact the flange 311 of the housing 301. An opening 343 allows light to exit the housing 301 and illuminate the mirror display part 350 when the housing is bonded to the mirror 230. In one embodiment, the frame 341 is made of a double-sided tape that bonds the flange 311 to the mirror 230.

The mirror 230 includes a transparent base 235 having a coating 237 on the back surface side thereof. The base 235 may be made of glass, plastic, or any suitable transparent material. The coating 237 may have one or a plurality of layers applied to the base so that a viewer such as a driver of the vehicle 1000 can see the outer surface 231 of the mirror to reflect light. The coating 237 includes, as a whole, a material having reflective properties such as metal. For example, aluminum and silver are known reflective coating materials for making mirrors. Other materials and/or layers, such as a protective layer, may be included in the coating 237. The coating 237 makes the base 235 opaque or translucent.

The mirror display part 350 is generally provided by a mask for masking light from the light source 327. In one embodiment, a simple mask component with an aperture to allow light to pass therethrough may be used. Preferably, the mirror display part 350 is integrated with the mirror 230 as illustrated in FIG. 10. For example, the display part 350 may be printed on the surface of the mirror or laser-etched by removing a part of the reflective coating 237 from the back side of the mirror 230. Alternatively, the region of the display part 350 may be masked before the reflective coating 237 is applied to the base 235. In the embodiment of FIG. 10, the mirror display part 350 is illustrated in a simple triangular shape, but may have any shape. In this regard, the display part 350 may take the form of a sign, or may itself be an indicator that transfers meaning to a viewer. For example, the display part 350 may take the form of a vehicle overtaking sign under ISO.

The illuminatable mirror display device 300 may be assembled by first inserting the circuit assembly 320 into the circuit cavity 307 of the housing 301. As described above, the portion of the cavity 307 is shaped to accommodate therein the corresponding portion of the corresponding circuit assembly. Moreover, the cavity 307 is preferably configured to guide the circuit assembly 320 to a predetermined position so that the light source 327 is aligned with the reflective cavity 305. The housing 301 and the circuit assembly 320 together form the illumination device for illuminating the mirror display part 350. The lighting diffuser 330 is provided on the support surface 315, and covers the opening in the reflective cavity 305 of the housing 301 as a whole. A first side of the frame 341 of the adhesive element is fixed to the flange 311 of the housing 301 so that the opening 343 of the adhesive element is aligned with the opening of the housing, and light from the light source 327 exits the reflective cavity 305. Next, an opposite side of the frame 341 of the adhesive element is fixed to the back side of the mirror 230 so that the circuit assembly 320 and the lighting diffuser 330 are contained in a casing formed by the housing 301 and the mirror 230. The mirror display region 233 roughly corresponds to the housing 301 and the opening of the adhesive element 340, whereby the entire region is exposed to light and the mirror display region 233 can be illuminated.

Figure 12:
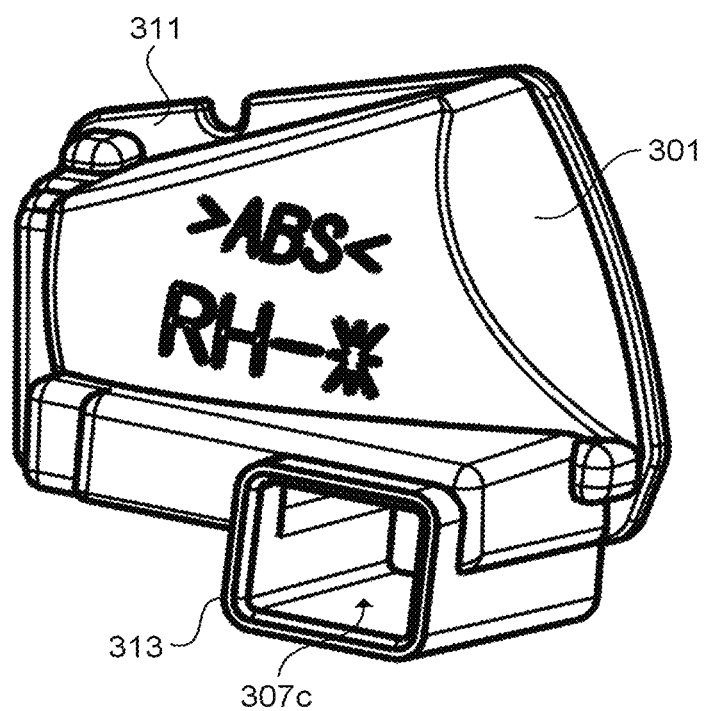
FIG. 12 is a rear perspective view of the housing of the exemplary illuminatable mirror display device illustrated in FIG. 10.

In the embodiment of FIG. 10, in a state in which the illuminatable mirror display device 300 has been assembled, a connector of a vehicle wiring harness can be connected to the connector 329. FIG. 12 is a rear perspective view of the exemplary housing of the illumination device for illuminating the mirror display part according to the embodiment of the present disclosure. As illustrated, the housing 301 has a connector opening 313 to the cavity part 307c of the circuit cavity 307. Although not illustrated in FIG. 12, when the circuit assembly 320 is contained in the cavity 307, the connector 329 is exposed so that the connector from the vehicle wiring harness can be connected to the connector 329.

Figure 13:
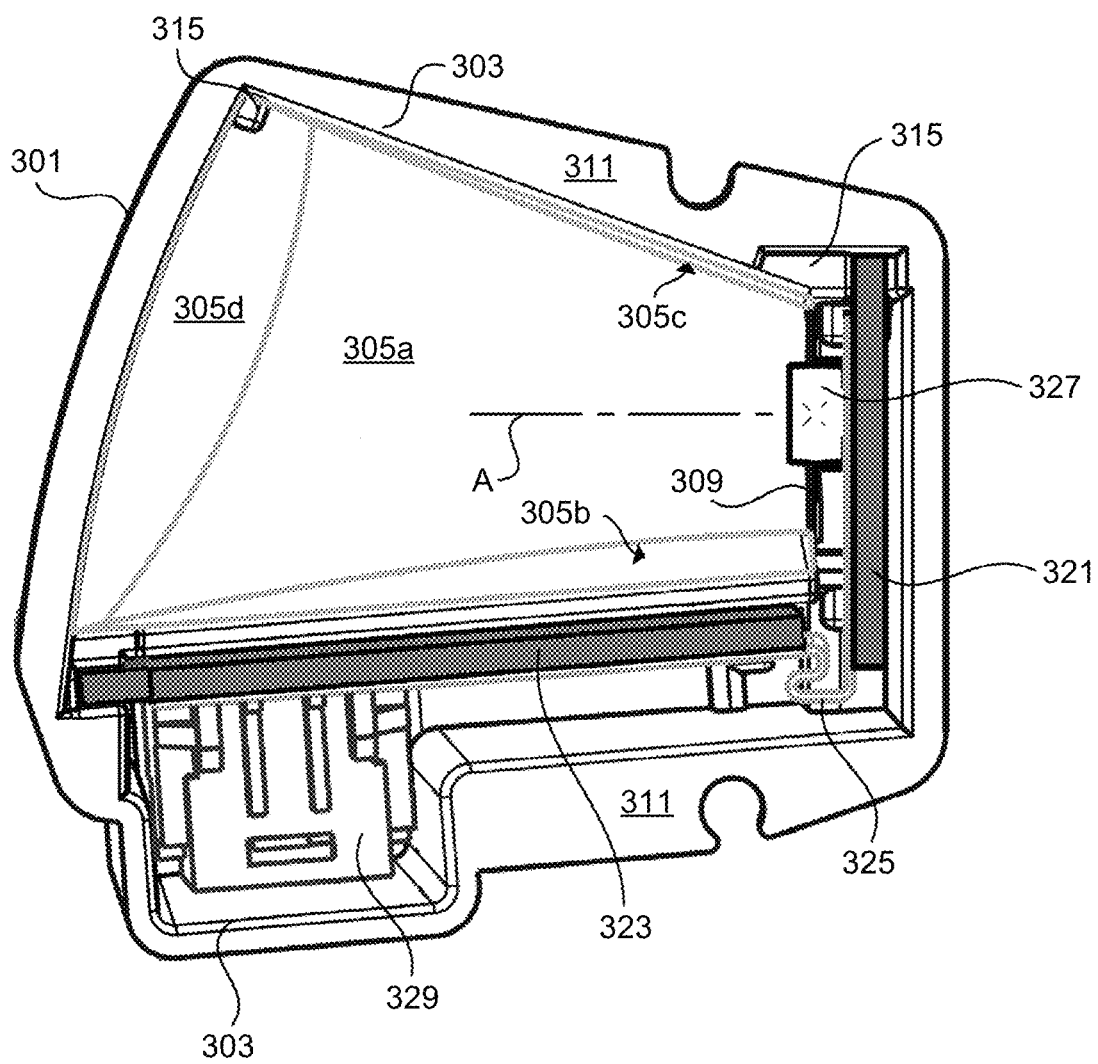
FIG. 13 is a plan view of the inside of an assembled illumination device for illuminating a mirror display part according to an embodiment of the present disclosure.

FIG. 13 is a plan view of the inside of the assembled illumination device for illuminating the mirror display part according to an embodiment of the present disclosure. The circuit assembly 320 is provided in the circuit cavity 307 of the housing 301, whereby the first circuit board 321 is provided in the cavity part 307a, the second circuit board 323 is provided in the cavity part 307b, and the connector 329 is provided in the cavity part 307c. In the embodiment of FIG. 13, a part of the light source 327 extends into the reflective cavity 305 through the opening of the partition 309. The light source 327 is positioned with an illustrated axis A such that light from the light source is incident on the reflective surface 305a having a granular surface for diffusing the light.

Figure 14A:
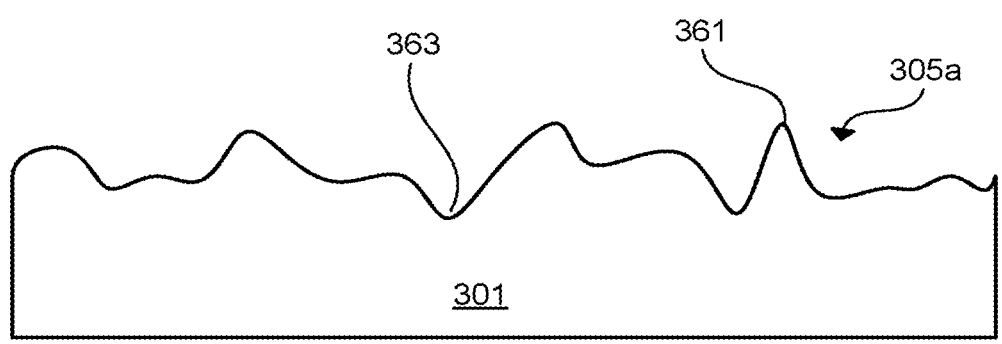
FIG. 14A is a schematic sectional view of an exemplary reflective surface of the housing of the illuminatable mirror display device according to an embodiment of the present disclosure.
Figure 14B:
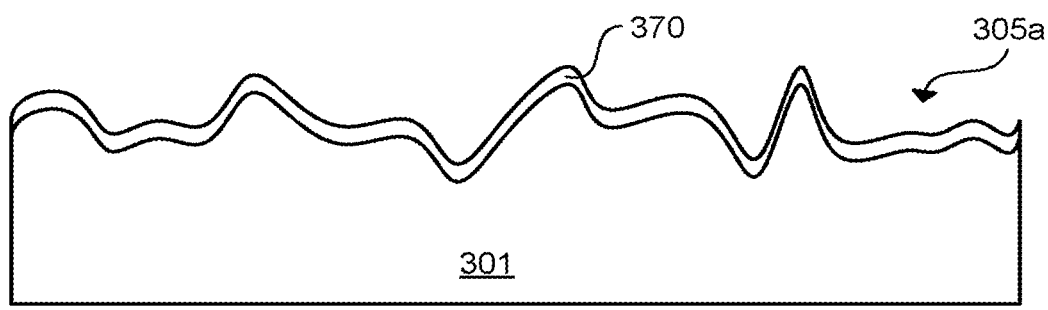
FIG. 14B is a schematic sectional view of another exemplary reflective surface of the housing of the illuminatable mirror display device according to an embodiment of the present disclosure.

FIG. 14A is a schematic sectional view of an exemplary reflective surface 305a having a granular surface according to an embodiment of the present disclosure. As illustrated, the reflective surface 305a includes vertexes 361 and valleys 363, and forms a surface topology suitable for diffusing light incident thereon. As described above, the reflective surface 305a may be coated with a layer of a material that improves the reflectance of the surface 305a. FIG. 14B illustrates an exemplary reflective surface 305a having a granular surface further coated with a reflective layer 370. The reflective layer 370 may be aluminum, silver, or any suitable metal layer that improves reflectance. In one embodiment, the layer 370 is formed by metal deposition to provide a good conformal coating of a granular surface so as to maintain a diffusion topology of the granular reflective surface 305a. The thickness of the reflective coating is also selected to maintain the diffusion properties of the granular surface.

Referring again to FIG. 13, the axis A of the light source 327 is provided between the side surfaces 305b and 305c that are opposed to each other and face each other. The axis A is substantially parallel to each of the opposing side surfaces 305b and 305c. In a preferred embodiment, these side surfaces 305b and 305c each include a smooth finished surface to facilitate the removal of the housing 301 from the mold after injection molding. The side surface 305d has a granular surface like the reflective surface 305a described above.

Figure 15:
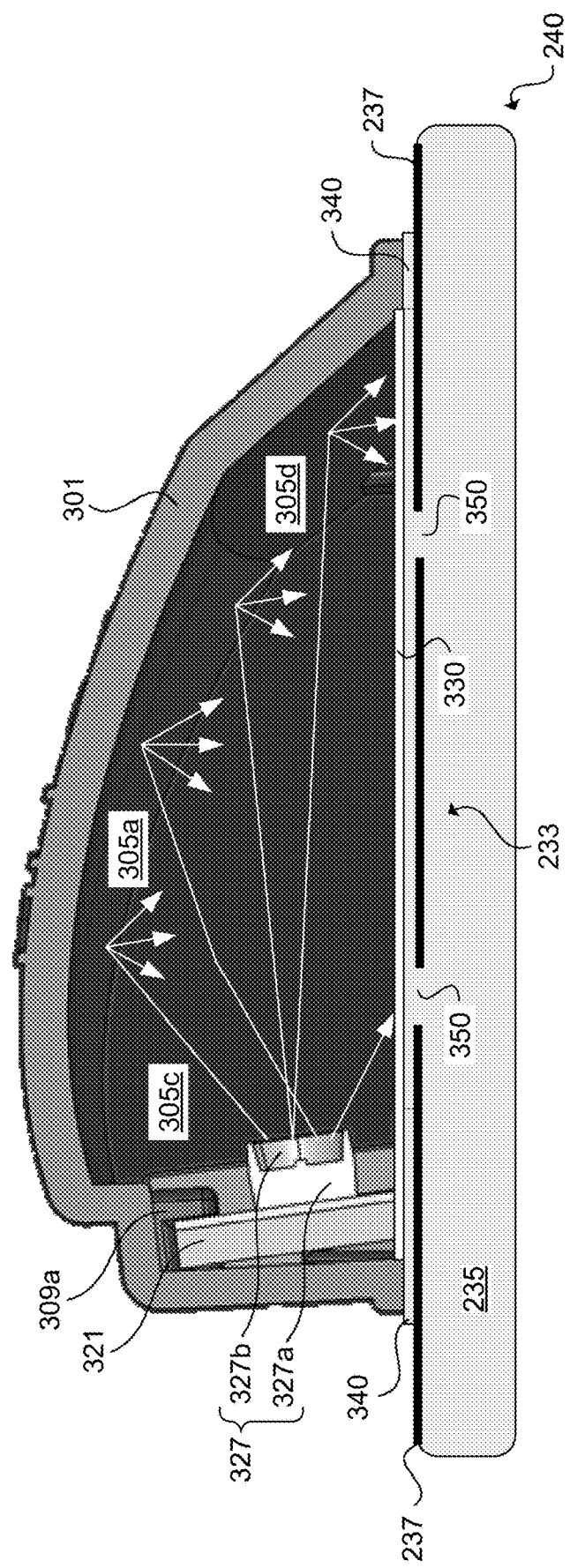
FIG. 15 is a sectional view of an exemplary mirror assembly including the illuminatable mirror display device with an exemplary light path according to an embodiment of the present disclosure.

FIG. 15 is a sectional view of an exemplary mirror assembly including the illuminatable mirror display device with an exemplary light path according to an embodiment of the present disclosure. As illustrated, the partition segment 309a separates the reflective cavity 305 from the circuit cavity 307. The first circuit board 321 is provided in a recess formed by the partition segment 309a such that the light source 327 has an axis intersecting the reflective surface 305a. The light source 327 is illustrated to include an LED 327a and a sealing material 327b. The adhesive element 340 is used to fix the housing 301 to a mirror 240 with the optional lighting diffuser 330 that covers the light output opening of the reflective cavity. The mirror display part 350 is provided by not applying the reflective coating 237 on the back side of the mirror 240. The two non-application regions are illustrated to represent the portion of the triangular display part 350. These regions may optionally include a partially transparent reflective coating. This coating externally appears as a mirror and allows light to come out, whereby the display part 350 is illuminated.

In the embodiment of FIG. 15, the reflective surface 305a is a granular surface for diffusing light incident thereon. The side surfaces 305b (not illustrated) and 305c are smooth to facilitate the removal of the housing 301 from the injection molding mold. The side surface 305d is also a granular surface, but does not substantially contribute to the illumination of the mirror display part 350. In the embodiment of FIG. 15, all the surfaces of the reflective cavity are coated with aluminum to improve reflectance.

The light from the light source 327 is non-directional when it enters the cavity, so that it is incident at an angle on all the surfaces forming the reflective cavity. A part of input light incident on the reflective surface 305a is diffused due to the granular finished surface of this surface. Since the opening surface of the housing 301 faces the reflective surface 305a, most of the diffused light is roughly directed toward the opening. The light incident on the side surface 305d is also diffused by the granular surface, but does not substantially contribute to light output from the housing 301. The side surfaces 305b (not illustrated) and 305c are substantially orthogonal to the opening surface of the housing, so that light is hardly reflected therefrom and directly exits the housing 301. Nevertheless, these side surfaces 305b and 305c serve as specular reflectors that can direct light toward the reflective surface 305a, and the light can be secondarily diffused and can exit the housing. In the embodiment of FIG. 15, the reflective surface 305a is designed to diffuse sufficient light toward the opening in order to illuminate the mirror display part.

With the above arrangement, the reflective cavity is entirely filled with diffused light. This diffused light provides the output of uniform light intensity, which uniformly illuminates the mirror display part 350. Moreover, the lighting diffuser 330 may be optionally provided to further scatter the diffused light so as to improve the uniformity of the display part 350 when illuminated.

The concepts of the present invention, including all the embodiments illustrated and described herein, can be used alone or together and/or in combination of one or a plurality of features covered by one or a plurality of the claims set forth herein, and includes, but not limited thereto, the overview of the present invention and one or a plurality of features or steps set forth in the claims.

The system, device, process, and method described herein constitute the preferred embodiments of the present invention, but the present invention is not limited to this strict system, device, process, and method, and it should be understood that changes can be made without departing from the scope of the present invention defined in the accompanying claims.

REFERENCE SIGNS LIST 1 lamp unit
2, 210 casing
3, 327 light source
3A optical axis
4 reflector
4A, 100Ba reflective surface
5 mask
5A light transmitting part
5B non-light transmitting part
6 wall material
6A wall surface
31 substrate
31A reference surface
100, 101 vehicle mirror device
100A mirror housing
100B mirror
200 mirror assembly 220 vehicle mounting arm
230, 240 mirror
250, 350 mirror display part
231 outer surface
233 region, display region, mirror display region
235 base
237 reflective coating
300 mirror display device
301 housing
303 opening edge
305 reflective cavity
307 circuit cavity
307a, 309a first partition segment
307b, 309b second partition segment
311 flange
313 connector opening
315 support surface
320 electric circuit assembly (circuit assembly)
321 first circuit board
323 second circuit board
325 wiring
327a LED
327b sealing material
331 body
333 edge
340 adhesive unit
340 adhesive element
341 frame
350 display part
361 vertex
363 valley
370 reflective layer
DL door
F windshield
H steering wheel
L normal line
M vehicle
P eye point
α angle
β angle
θ obtuse angle

The invention claimed is:

1. A vehicle mirror device, comprising:
a mirror housing attached to a vehicle; and
a mirror that is held by the mirror housing and transmits light from inside of the mirror housing while reflecting light from outside of the mirror housing, wherein
the mirror housing accommodates therein
a light source,
a reflective cavity having a reflective surface facing the opening surface of the mirror housing, at least a part of the reflective surface including a granular surface,
a circuit cavity including an electrical circuit associated with the vehicle mirror device,
a partition separating the reflective cavity from the circuit cavity and extending from the reflective surface along a partition surface that intersects the opening surface, and
a mask having a light transmitting part through which the light from the light source reflected by the reflector is transmitted, and
the light source and the reflector are arranged so that reflected light is projected toward the light transmitting part of the mask by one time of reflection, and the reflector is arranged so that the reflected light is projected at an angle with respect to a normal line of a reflective surface of the mirror.

2. The vehicle mirror device according to claim 1, further comprising:
a wall surface that guides light that is emitted from the light source but is not directed to the reflector, toward the reflective surface of the reflector without blocking light that is emitted from the light source and enters the reflector as well as the reflected light by the reflector and is projected toward the light transmitting part of the mask.

3. The vehicle mirror device according to claim 1, wherein an optical axis of the light source is arranged to be inclined toward the reflective surface of the reflector.

4. An illumination device for illuminating a vehicle mirror display part, the illumination device comprising:
a housing having an opening edge that defines an opening surface of the housing, the housing including
a reflective cavity having a reflective surface facing the opening surface of the housing, at least a part of the reflective surface including a granular surface,
a circuit cavity including an electrical circuit associated with the illumination device, and
a partition separating the reflective cavity from the circuit cavity and extending from the reflective surface along a partition surface that intersects the opening surface; and
a light source provided in the circuit cavity, configured to emit light into the reflective cavity, and having an optical axis intersecting the partition surface, the light source being configured such that at least a part of the light emitted from the light source enters the reflective surface, the reflective surface diffusing the part of the light in a random direction so that at least a part of reflected light exits the opening surface of the housing.

5. The illumination device according to claim 4, wherein
the housing further includes a flange extending outward from the opening edge along the opening surface, and
the flange is configured to attach the housing to a flat base.

6. The illumination device according to claim 4, wherein the reflective surface includes a reflective layer provided on the granular surface.

7. The illumination device according to claim 4, wherein the reflective cavity includes a plurality of side surfaces extending from the reflective surface to the opening edge of the housing to form the reflective cavity.

8. The illumination device according to claim 7, wherein at least one of the side surfaces includes a smooth finished surface.

9. The illumination device according to claim 8, wherein at least one of the side surfaces includes a granular finished surface.

10. The illumination device according to claim 7, wherein the side surfaces include:
opposing sidewalls that extend along the optical axis and face each other so that the optical axis is located between the opposing sidewalls; and
an end sidewall that the optical axis intersects.

11. The illumination device according to claim 10, wherein each of the opposing sidewalls includes a smooth finished surface.

12. The illumination device according to claim 11, wherein the end sidewall is a granular finished surface.

13. The illumination device according to claim 4, wherein the circuit cavity includes a plurality of cavity parts.

14. The illumination device according to claim 13, wherein the cavity parts include a light source cavity portion accommodating therein at least a part of the light source.

15. The illumination device according to claim 4, wherein the partition does not extend to the opening edge so as to form a light entrance opening on the partition surface.

16. The illumination device according to claim 15, wherein the partition surface is inclined from a position orthogonal to the opening surface.

17. The illumination device according to claim 4, wherein the optical axis of the light source does not intersect the opening surface.

18. The illumination device according to claim 17, wherein the optical axis of the light source is not parallel to the opening surface so as to intersect the reflective surface.

19. The illumination device according to claim 4, further comprising a lighting diffuser that substantially covers an opening of the reflective cavity.

20. A vehicle mirror display assembly to be illuminated, the vehicle mirror display assembly comprising:
 an illumination device including a housing having an opening edge that defines an opening surface of the housing, the housing including
  a reflective cavity having a reflective surface facing the opening surface of the housing, at least a part of the reflective surface including a granular surface,
  a circuit cavity including an electrical circuit that provides an electrical function to the illumination device, and
  a partition separating the reflective cavity from the circuit cavity and extending from the reflective surface along a partition surface that intersects the opening surface;
 a light source provided in the circuit cavity, configured to emit light into the reflective cavity, and having an optical axis intersecting the partition surface, the light source being configured such that at least a part of the light emitted from the light source enters the reflective surface, the reflective surface diffusing the part of the light in a random direction so that at least a part of reflected light exits the opening surface of the housing; and
 a mirror display part connected to the illumination device so that the mirror display part is illuminated with the part of the reflected light exiting the opening surface of the housing.

21. The mirror display assembly that is illuminated according to claim 20, wherein the mirror display part includes a mask incorporated in a mirror coating.

22. A vehicle mirror comprising the mirror display assembly to be illuminated according to claim 20.

* * * * *